United States Patent
Grimm et al.

(10) Patent No.: US 7,739,036 B2
(45) Date of Patent: Jun. 15, 2010

(54) SPEED LIMIT ADVISOR

(75) Inventors: Donald K. Grimm, Utica, MI (US); Varsha Sadekar, Sterling Heights, MI (US); Sarmad Y. Hermiz, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 343 days.

(21) Appl. No.: 11/213,411

(22) Filed: Aug. 26, 2005

(65) Prior Publication Data
US 2007/0050130 A1 Mar. 1, 2007

(51) Int. Cl.
*G01C 21/32* (2006.01)

(52) U.S. Cl. .................... 701/208; 701/200; 701/207; 701/210; 701/93; 701/117; 340/905; 340/906; 340/933

(58) Field of Classification Search .............. 701/208, 701/93, 117, 200, 210, 207; 340/905, 933, 340/934, 988, 441
See application file for complete search history.

(56) References Cited

U.S. PATENT DOCUMENTS

| | | | | |
|---|---|---|---|---|
| 5,485,161 A * | 1/1996 | Vaughn | ................ | 342/357.13 |
| 5,724,316 A * | 3/1998 | Brunts | ................ | 368/10 |
| 5,819,198 A * | 10/1998 | Peretz | ................ | 701/117 |
| 6,008,740 A * | 12/1999 | Hopkins | ................ | 340/905 |
| 6,118,403 A * | 9/2000 | Lang | ................ | 342/357.09 |
| 6,278,935 B1 * | 8/2001 | Kaplan et al. | ................ | 701/200 |
| 6,381,536 B1 * | 4/2002 | Satoh et al. | ................ | 701/208 |
| 6,515,596 B2 * | 2/2003 | Awada | ................ | 340/905 |
| 6,526,352 B1 | 2/2003 | Breed et al. | | |
| 6,542,808 B2 * | 4/2003 | Mintz | ................ | 701/117 |
| 6,675,085 B2 * | 1/2004 | Straub | ................ | 701/93 |
| 6,720,889 B2 * | 4/2004 | Yamaki et al. | ................ | 340/933 |
| 6,778,074 B1 * | 8/2004 | Cuozzo | ................ | 340/441 |
| 6,807,464 B2 * | 10/2004 | Yu et al. | ................ | 701/1 |
| 6,845,317 B2 * | 1/2005 | Craine | ................ | 701/200 |
| 6,895,324 B2 * | 5/2005 | Straub | ................ | 701/93 |
| 6,898,513 B2 | 5/2005 | Blumbergs et al. | | |
| 7,183,942 B2 * | 2/2007 | Rock et al. | ................ | 340/905 |
| 2002/0022920 A1 * | 2/2002 | Straub | ................ | 701/93 |
| 2002/0082767 A1 * | 6/2002 | Mintz | ................ | 701/117 |
| 2003/0052797 A1 * | 3/2003 | Rock et al. | ................ | 340/936 |
| 2003/0128135 A1 * | 7/2003 | Poltorak | ................ | 340/906 |
| 2004/0107037 A1 * | 6/2004 | Straub | ................ | 701/93 |
| 2005/0083211 A1 | 4/2005 | Shafir et al. | | |
| 2005/0267681 A1 * | 12/2005 | Yato | ................ | 701/210 |

(Continued)

FOREIGN PATENT DOCUMENTS

EP 1162102 A2 12/2001

*Primary Examiner*—Thomas G Black
*Assistant Examiner*—Wae Louie (57) ABSTRACT

A navigation system (10) adapted for use with a vehicle (12) having an operator (14) includes a map database (16) presenting a current vehicle path, a locator device (20) communicatively coupled to the database (16) and configured to determine the location of the vehicle (12) and to associate the location with a position point within the database (16). The system (10) further includes an improved indicator (34) configured to predictively communicate an upcoming condition to the operator (14), determine a time-dependent-variable condition, compare a current condition of the vehicle (12) to the upcoming condition, and alert the operator (14) to a non-compliant comparison. The system (10) is further configured to receive preferences from the operator (14) and vehicle (12), so as to present a modifiable mode of operation.

16 Claims, 4 Drawing Sheets

U.S. PATENT DOCUMENTS

2006/0293844 A1* 12/2006 Sawaki ........................ 701/207
2007/0050130 A1* 3/2007 Grimm et al. ............... 701/208
2007/0112503 A1* 5/2007 Johnson et al. ............. 701/117

* cited by examiner

FIG. 2

TIME-SPECIFIC DATABASE
INDIANA

50

| COUNTY | ZONE | DST |
|---|---|---|
| Adams County | ET | No |
| Allen County | ET | No |
| Bartholomew County | ET | No |
| Benton County | ET | No |
| Blackford County | ET | No |
| Boone County | ET | No |
| Brown County | ET | No |
| Carroll County | ET | No |
| Cass County | ET | No |
| Clark County | ET | Yes |
| Clay County | ET | No |
| Clinton County | ET | No |
| Crawford County | ET | No |
| Daviess County | ET | No |
| Dearborn County | ET | Yes |
| Decatur County | ET | No |
| DeKalb County | ET | No |
| Delaware County | ET | No |
| Dubois County | ET | No |
| Elkhart County | ET | No |
| Fayette County | ET | No |
| Floyd County | ET | Yes |
| Fountain County | ET | No |
| Franklin County | ET | No |
| Fulton County | ET | No |
| Gibson County | CT | Yes |
| Grant County | ET | No |
| Greene County | ET | No |
| Hamilton County | ET | No |
| Hancock County | ET | No |
| Harrison County | ET | Yes |
| Hendricks County | ET | No |
| Henry County | ET | No |
| Howard County | ET | No |
| Huntington County | ET | No |
| Jackson County | ET | No |
| Jasper County | ET | No |
| Jay County | ET | No |
| Jefferson County | ET | No |
| Jennings County | ET | No |
| Johnson County | ET | No |
| Knox County | ET | No |
| Kosciusko County | ET | No |
| LaGrange County | ET | No |
| Lake County | CT | Yes |
| LaPorte County | CT | Yes |
| Lawrence County | ET | No |
| Madison County | ET | No |
| Marion County | ET | No |
| Marshall County | ET | No |
| Martin County | ET | No |
| Miami County | ET | No |
| Monroe County | ET | No |
| Montgomery County | ET | No |
| Morgan County | ET | No |
| Newton County | CT | Yes |
| Noble County | ET | No |
| Ohio County | ET | Yes |
| Orange County | ET | No |
| Owen County | ET | No |
| Parke County | ET | No |
| Perry County | ET | No |
| Pike County | ET | No |
| Porter County | CT | Yes |

SPEED LIMIT ADVISOR

BACKGROUND OF THE INVENTION

1. Technical Field

The present invention relates to navigation systems adapted for use with a vehicle, and more particularly to an improved system configured to predictively communicate upcoming conditions to an operator of the vehicle.

2. Background Art

It is well known that speeding is one of the most prevalent factors contributing to vehicular accidents. More particularly, these accidents often result when the rate of speed of one or more of the automobiles exceed the rate of speed for which the thoroughfare was designed. Licensed civil engineers typically design thoroughfares based in part on available site distances due to the vertical curvatures (i.e. K values) of the terrain and intersection obstructions. The thoroughfare is designed, such that a typical driver and vehicle combination having an average reaction time and minimum deceleration capabilities is able to stop when identifying an object of minimal height in its path. Thus, when a vehicle is speeding, it is more difficult and sometimes not possible for the driver to safely steer around the object. Despite the efforts of departments of transportation in posting signage, it is appreciated that a driver may not be paying attention and miss a sign or that a sign may have been removed or obscured, such as by other traffic, foliage, construction, or the like.

To better inform the driver, redundant in-vehicle systems have been developed to inform the operator or driver of the applicable speed limit or condition. For instance, it is known to utilize a Global Positioning System (GPS) or cellular telephone technology and a map database to cooperatively inform the operator of the current speed limit or other indicia. It is also known to calculate or obtain the actual speed of the vehicle, compare it to the applicable speed limit, and signal to the driver when the vehicle exceeds the posted speed limit. It is also known to conduct "marking" or inputting of the speed limits into the database.

These conventional systems, however, are reactionary systems that do not provide predictive means for warning the driver of the upcoming speed limit change or condition. These systems also do not provide means for properly addressing special conditions, such as local time dependent variables, and changes in local time as the vehicle travels across geography. Of yet further concern, these systems also present rigid one-size-fits-all models that do not enable modifications by an operator.

DISCLOSURE OF INVENTION

Responsive to these and other concerns caused by conventional navigational systems and methods, the present invention concerns an improved system that assists drivers in better information as to posted speed limits and other conditions. Among other things, the invention provided hereof, is useful for providing a modifiable and predictive system. The inventive system is also useful for properly addressing and relaying time-dependent conditions to the driver.

A first aspect of the present invention concerns a navigational system adapted for use with a vehicle having an operator. The system includes a map database having at least one record, wherein said record represents a path. The path presents a direction of travel, and includes a plurality of positional points, wherein a first of said points is correlated with indicia data. The system also includes a locator device communicatively coupled to the database, and configured to determine the location of the vehicle, and match said location with a second of said points on the record. Finally, the system further includes an indicator communicatively coupled to the device and database, and configured to predictively communicate a data-related signal to the operator, when the vehicle is a minimum distance or time from and traveling towards the first point.

A second aspect of the present invention concerns a method of predictively communicating a time-dependant variable condition to the operator of a vehicle. The method includes the steps of obtaining the vehicle position in latitude and longitude coordinates. The vehicle position is matched with a point upon an in-vehicle map-database to obtain an ID link on which the vehicle is currently positioned within the map database. Time-specific information is obtained using the ID link, and the in-vehicle clock is modified accordingly if necessary. Finally, the current condition is determined utilizing the correct local time.

It will be understood and appreciated that the present invention provides a number of advantages over the prior art, including, for example, predictively communicating to the operator of a vehicle an imminently approaching traffic condition or value. This invention increases the efficiency of vehicle navigation and traffic flow, and provides a flexible system that is modifiable to suit the preferences of a particular operator. The present invention also provides an advisory navigation system capable of determining the correct local time for a geographic location.

Other aspects and advantages of the present invention will be apparent from the following detailed description of the preferred embodiment(s) and the accompanying drawing figures.

BRIEF DESCRIPTION OF DRAWINGS

A preferred embodiment of the invention is described in detail below with reference to the attached drawing figures, wherein.

MODES FOR CARRYING OUT THE INVENTION

Figure 1:
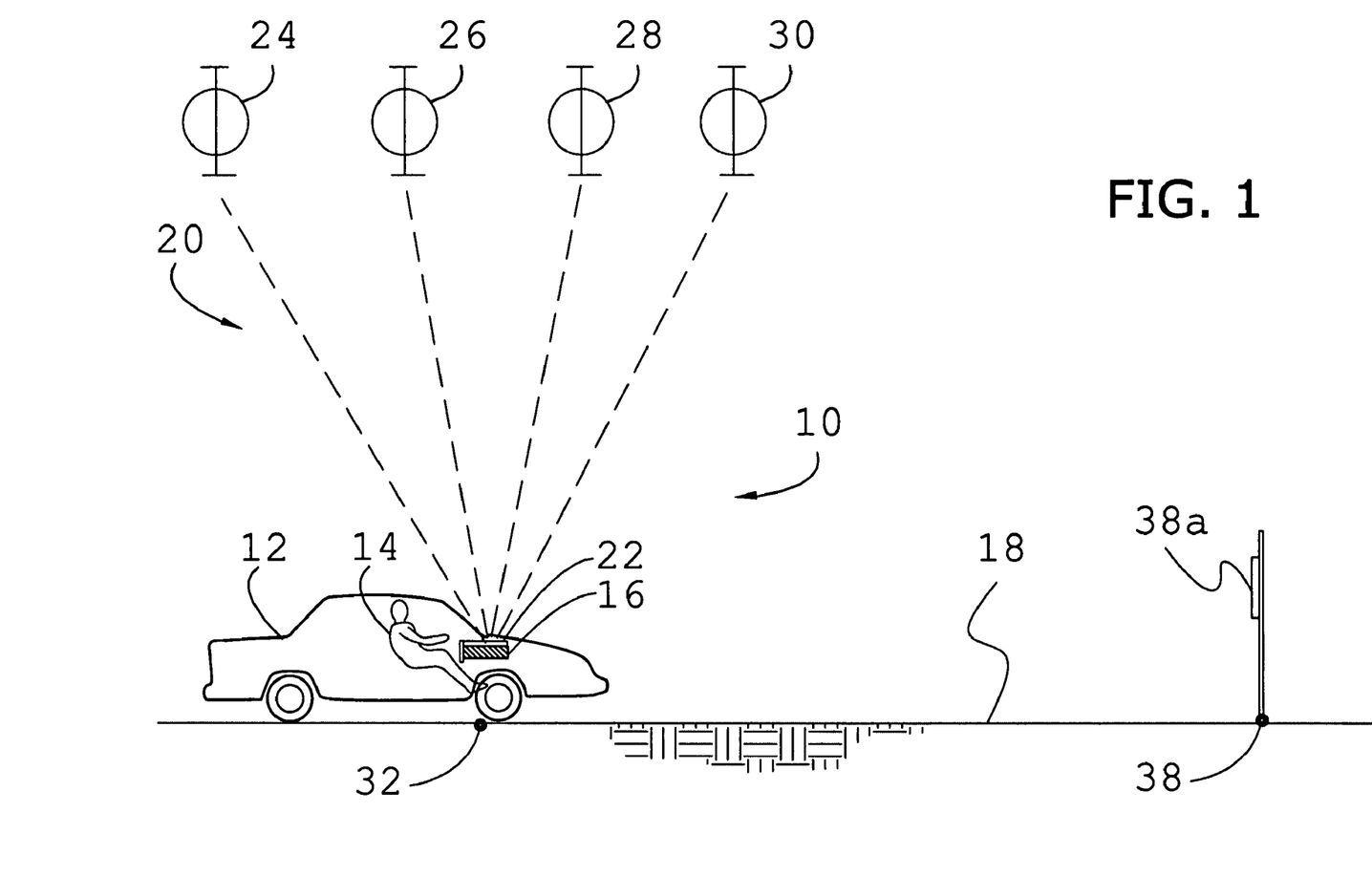
FIG. 1 is an elevation view of a navigation system, vehicle and operator in accordance with a preferred embodiment of the present invention.

As shown in FIG. 1, the present invention concerns an improved navigational system 10 adapted for use with a vehicle 12 and by an operator 14. The system 10 is configured to predictively communicate an approaching milestone, landmark, traffic sign, destination, device, notice of accident or traffic-jam, or other indicia to the operator. That is to say, the system 10 is configured to alert the operator 14 of a future condition within its path based on the current location of the vehicle 12. The system 10 is further configured to provide an advisory warning to the operator 14 based on a comparison of the future condition and the current location and condition of the vehicle 12. The system 10 is illustrated and described herein with respect to automobiles such as cars, SUV's, trucks, etc. However, it may also be utilized with airborne and watercraft vehicles, human motility, or whenever navigation and predictive alerts of future conditions are desired.

Figure 2:
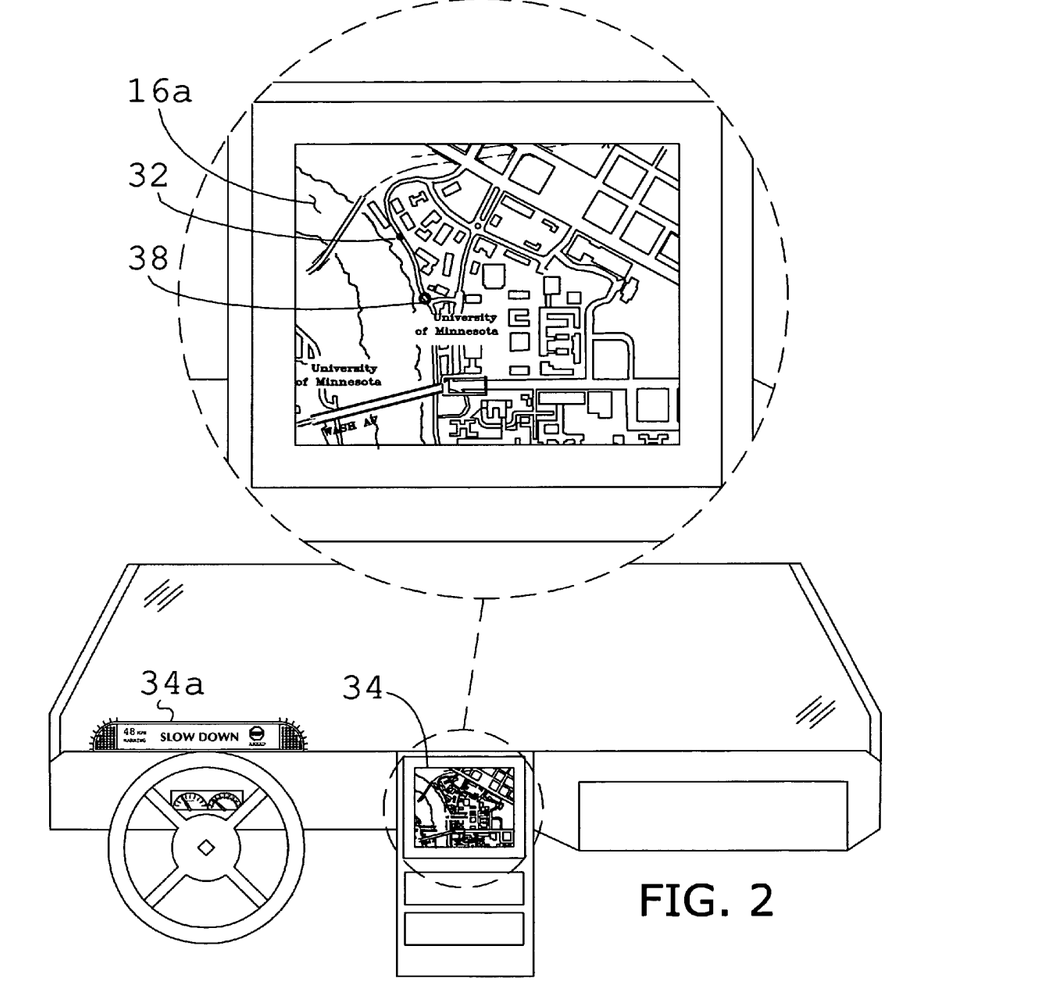
FIG. 2 is an elevation view of the dashboard of the vehicle and navigation system shown in FIG. 1, particularly illustrating the monitor, map record, and signal.

Turning to the configuration of the system 10, a database 16 having at least one map record 16a consisting of position points is provided, wherein each point corresponds to a location upon the earth or other planetary body (see FIGS. 1 and 2). The points represent at least one path 18, and more preferably, represent a plurality of paths, so as to form a road map. At least a portion of the points include ID links that enable correlation between a given point and indicia data corresponding to an actual condition at the corresponding location. In a preferred embodiment, the indicia data may be inputted, or modified by the operator. Finally, the database 16 may be stored in the system 10 by conventional storage means such as CD-ROM, internal hard disk, removable memory cards, etc.

The system 10 includes a locator device 20 configured to determine the geographic location of the vehicle preferably under a three-dimensional coordinate system. As shown in FIG. 1, a preferred embodiment of the locator 20 determines the longitude, latitude and height coordinates of the vehicle under GPS, and as such, further includes a GPS receiver 22 attached to or positioned within the vehicle 12, and at least four mapped satellites 24,26,28,30 communicatively coupled and configured to deliver separate transmission signals to the receiver 22 at all times. Alternatively, other signal sources located at control points could be communicatively coupled to the receiver 22, and other coordinate systems based on a variety of geodetic datums, units, projections, and references, such as Military Grid Reference System (MGRS) or ECEF X,Y,Z could be utilized in accordance with the present invention. Finally, the preferred locator device 20 is communicatively coupled to the database 16, and the two are cooperatively configured to correlate the actual location of the vehicle 12 to a first position point 32 upon the map record 16a. As shown in FIG. 2, the preferred system 10 further includes a monitor 34 that is communicatively coupled to the database 16 and locator device 20, and configured to display the map record 16a and vehicle location to the operator 14.

The system 10 further includes an indicator 36 configured to predictively communicate a signal 34a to the operator 14, when the vehicle 12 is located a minimum distance or time from and is traveling towards a second position point 38 of interest. The signal 34a is configured to alert the operator 14 to the indicia data correlated with the second point 38 for a predetermined period. More preferably, when the indicia data of the second point 38 represents a traffic regulation, the indicator 36 is configured to compare the current condition of the vehicle 12 to the conditions necessary to comply with the data. Once compared, the signal 34a is further configured to alert the operator of a noncompliant condition. As such, the preferred indicator 36 includes program code and processing capabilities for determining advisory or desired relationships. Most preferably, the indicator 36 is configured to determine and the signal 34a is configured to convey varying degrees of non-compliance. For example, the signal 34a may be one of a plurality of signals that differ in color, pitch, loudness, location, font, verbiage, flashing rates, etc. The indicator 36 is communicatively coupled to the monitor 34 and may be configured to display the signal 34a thereupon; however, as shown in FIG. 2, it is certainly within the ambit of the invention to disassociate the signal 34a and monitor display of the map record 16a, so as to locate the signal 34a in a more readily perceived position.

Thus, the system 10 is configured to predictively alert the operator 14 to approaching conditions within the projected path and to non-compliant comparisons involving current conditions of the vehicle 12. The inventive aspects and functionality of the indicator 36 will be further described below in the context of speed limit indicia, with the understanding that the present invention is equally applicable to other forms of indicia.

I. Informing Drivers of Posted Speed Limits

Where speed limit indicia data is recorded in the vehicle map database 16, the speed limit value for the current road or path segment, upon which the vehicle 12 is located, is preferably retrieved and communicated to the operator 14 to provide redundancy. In a preferred embodiment of the invention, when the vehicle 12 is within a predetermined period (for the current rate of speed) from an upcoming speed limit decrease 38a, the upcoming speed limit is displayed instead of the current speed limit (see, FIG. 3). More preferably, the period is sufficient to enable vehicle deceleration to the upcoming speed limit given the current speed and preferred deceleration rate of the vehicle 12. Either the current or upcoming speed limit is preferably communicated to the operator 14 at all times, but may also be indicated upon operator demand either through visual, audio or haptic means (such as accelerator pedal force feedback). For example, a voice request/voice response or button press/voice response mechanism may be actuated when speed limit information is desired.

Alternatively, where the position point ID link includes the thoroughfare name a second database (not shown) that correlates names and speed limits may be utilized to determine the thoroughfare speed limit. It is appreciated by those ordinarily skilled in the art that the name of the thoroughfare often assists the operator in maintaining proper vehicle speed through word association. Where the operator is mistaken about the current location, road name information also helps with speed limit observance.

II. Warning Drivers of Speed Limit Exceedance

As previously mentioned, a novel aspect of the present invention includes alerting the operator 14 not only when the current speed limit is exceeded, but also where the upcoming speed limit is exceeded. In a preferred embodiment, two exceedance threshold values are compared to the current speed of the vehicle 12 to provide a two-stage alert (such as "Caution" and "Warning") to the operator 14. Alternatively, single stage alerts or continuously variable alerts (for example, a gradient display) can be implemented.

In a first preferred method for calculating speed limit exceedance, where V is the current vehicle speed and $V_{SpeedLimit}$ is the displayed speed limit, the indicator 36 determines the cautionary and warning thresholds based on a constant offset from the speed limit. For example, a caution may be communicated when a cautionary constant of 5 mph is exceeded, while a warning may be communicated when a constant of 10 mph is exceeded. Cautionary warnings are provided when the following is true:

$$V_{SpeedLimit}+V_{WarningConstant} > V \geq V_{SpeedLimit}+V_{CautionaryConstant}$$

Imminent warnings, such as the one shown in FIG. 2, will be provided when the following is true:

$$V \geq V_{SpeedLimit}+V_{WarningConstant}$$

In a second preferred method, the indicator 36 determines the cautionary and warning thresholds based on a percent exceedance of the speed limit. For example, the caution and warning thresholds may be an exceedance of 10% and 15% of the displayed speed limit, respectively. Cautionary warnings are therefore provided when the following is true:

$$V_{SpeedLimit} + (V_{SpeedLimit})(V_{WarningPercent}) > V \geq V_{SpeedLimit} + (V_{SpeedLimit})(V_{CautionaryPercent})$$

Imminent warnings will be provided when the following is true:

$$V \geq V_{SpeedLimit} + (V_{SpeedLimit})(V_{WarningPercent})$$

Finally, in a third preferred method, the indicator 36 determines the cautionary and warning thresholds based on a combination of percent exceedance along with a constant offset. In this configuration, cautionary warnings will be provided when the following is true (and the imminent warning threshold is not exceeded):

$$V \geq V_{SpeedLimit} \frac{G_{CautionaryMultiplier}}{100} + V_{CautionaryConstant}$$

Imminent warnings will be provided when the following is true:

$$V \geq V_{SpeedLimit} \frac{G_{WarningMultiplier}}{100} + V_{WarningConstant}$$

It is well within the ambit of the present invention for other methods of calculating speed exceedance to be utilized. In any implementation, however, where the cautionary and warning alert stage may be activated simultaneously, the indicator 36 shall deliver the warning alert stage to the operator 14 and suppress the cautionary alert stage.

III. Informing Drivers of Advisory Speed Zones

Figures 3, 4:
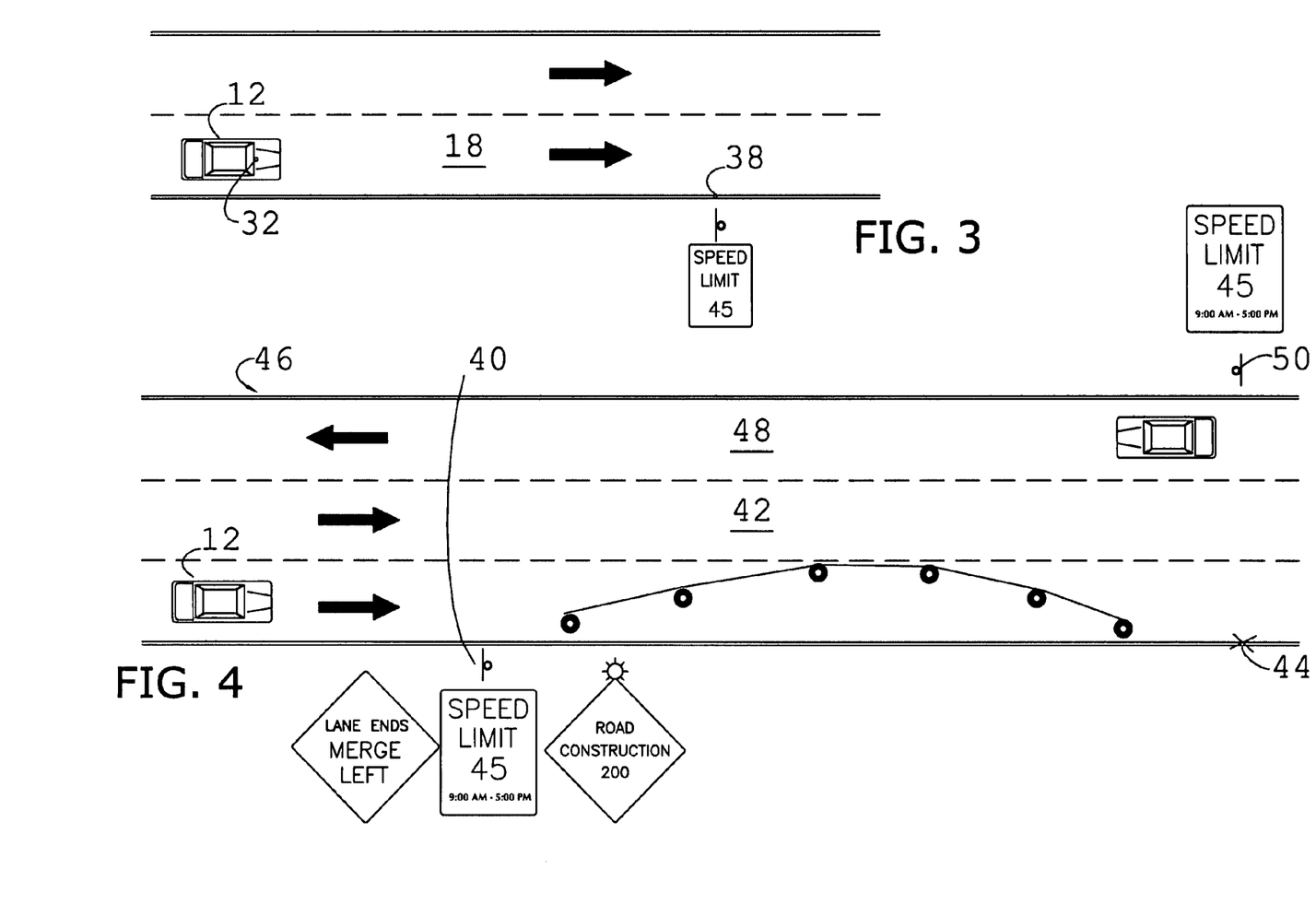
FIG. 3 is a plan view of the vehicle shown in FIGS. 1 and 2 upon a thoroughfare.
FIG. 4 is a plan view of the vehicle upon a thoroughfare having an advisory zone.

As shown in FIG. 4, where the upcoming speed limit decrease marks the beginning 40 of an advisory speed limit zone 42 the indicator 36 is configured to recognize the ending 44 of the zone or to display the advisory zone speed limit for a predetermined period. Where the adjacent path 46 presents an opposite direction of travel and a corresponding advisory speed limit zone 48, the ending 44 of the current path advisory zone 42 is congruent with the beginning 50 of the adjacent zone 48. In other words, the ending 44 of the current path advisory zone 42 and the beginning 50 of the adjacent zone 48 shall be deemed to be located at the same station.

Where a corresponding advisory zone does not exist for the other side of the thoroughfare, an advisory speed limit end time, $T_{AdvisorySpeedLimitEnd}$, determines when the advisory should no longer be communicated. This value is preferably defined as a calibration constant. Alternatively, an advisory zone distance measure can be recorded and utilized instead of the time measurement. In this case, the advisory will not be communicated after the vehicle has traversed a specified distance, which can also be defined as a system calibration constant.

A preferred deceleration rate value is used to gauge the time to arrival of the vehicle 12 to the beginning 40 of the advisory zone 42. The preview time for displaying an upcoming advisory speed zone, $T_{AdvisorySpeedLimitPreview}$, is calculated as shown below:

$$T_{AdvisorySpeedLimitPreview} = \max\left(\frac{(V_{Speed} - V_{UpcomingAdvisorySpeedLimit})}{R_{PreferredDeleration}}, G_{MinimumPreviewTime}\right)$$

Using this predictive time measure, the operator will always be informed of an upcoming advisory zone at least $G_{MinimumPreviewTime}$ seconds in advance of the sign location. For example, the minimum preview time, $G_{MinimumPreviewTime}$, may be 5 seconds. The preview time will be longer when it is calculated that the time necessary to decelerate from the current vehicle speed to the upcoming advisory speed limit at the preferred deceleration rate is greater than $G_{MinimumPreviewTime}$ seconds. The preferred driver deceleration rate can either be programmed into the system 10 as a calibration constant, or more preferably, inputted and modified by the operator 14.

Figure 5:
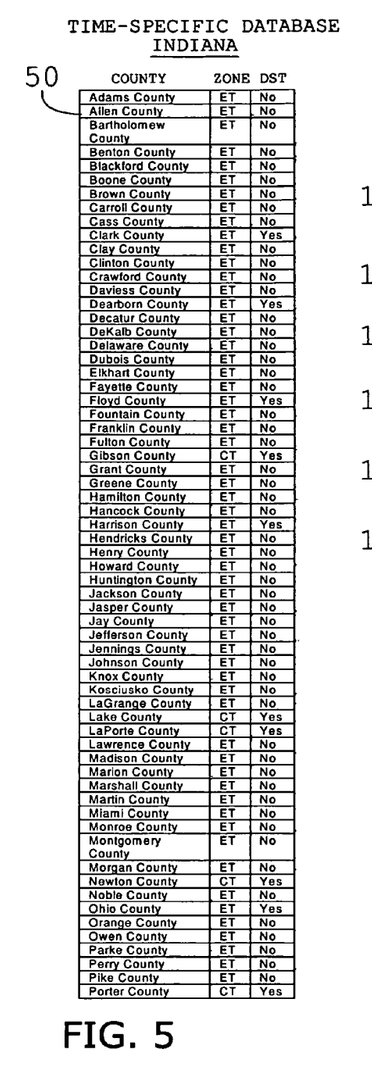
FIG. 5 is a table view of a time specific database, particularly illustrating time-zone data and day-light-savings observance values.

IV. Informing Drivers of Special Time Dependent Speed Limits

Where the advisory speed limit zone 42 or upcoming speed limit change presents a date and/or time dependent variable, as typical with school zones or rush hour congested areas, the system 10 is further configured to determine the correct local time. In a preferred embodiment, time data from the GPS and the in-vehicle map database 16 may be utilized to set and periodically synchronize the vehicle clock 48 to the current time and date. More particularly, where the map database 16 contains time zone and Daylight Savings Time (DST) observance attributes, these attributes, can be used directly to set the correct local time for a given position point. The correct time inside the vehicle 12 is maintained when the vehicle 12 crosses a time zone boundary and in areas where DST is observed.

Where the map database does not contain time information attributes, the system 10 preferably includes at least one time specific database 50 that correlates time information (i.e., time zone and DST observance) with geographic locale (see FIG. 5). In this configuration, the time specific database 50 is communicatively coupled to the map database 16 and locator device 20 via the ID link of a given position point. It is certainly within the ambit of the present invention, however, to combine the databases 16,50 to form one integral database. As shown in FIG. 5, time zone information for most locales can be separated by the name of the county for example. Although rare, in some sparsely populated areas, time zone boundaries cannot be easily extracted from the lookup tables because the time zone boundary does not follow a political boundary as defined in the map database 16 (e.g., a single county may contain multiple time zones). In this instance, it is appreciated that the geometry from a nearby road can be utilized to approximate the time zone boundary.

Automatic adjustment for DST is accounted for in a similar fashion by determining if the mapped locale observes DST. Where DST data is not included in the map database 16, a DST observance database (not shown) may be provided. More preferably, however, the time specific database 50 further includes DST observance values, "Yes" or "No", per geographic locale, as shown in column 3 of FIG. 5. For locales that do not observe DST, no time adjustment to the clock will occur when DST begins on the first Sunday of April each year. Accordingly, no time adjustment will be made for these locales when DST ends on the last Sunday in October of each year.

Figure 6:
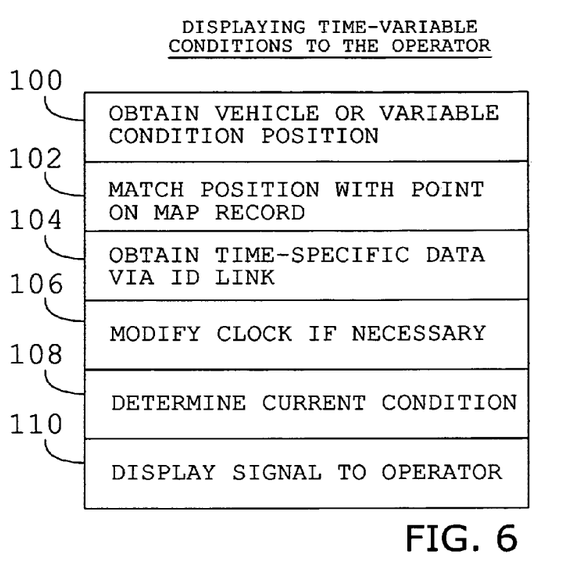
FIG. 6 is a diagrammatical representation of a method for obtaining time-specific data for a geographic location.

Thus, a preferred method of determining correct local time, where the in-vehicle map database 16 contains time zone and DST observance data, includes at a first step 100 positioning the vehicle in GPS coordinates (see FIG. 6). At a second step 102, the vehicle position is then matched with a position point on the in-vehicle map database 16 to obtain an ID link. At a third step 104, the time-specific information (time zone and DST observance) is then extracted from the map database 16 via the ID link. Once the time zone and DST observance is obtained, and at a step 106, time stamp information from the GPS is used to determine the correct local time for the current vehicle location. This GPS time is specified in milliseconds as Greenwich Mean Time (GMT), and is then adjusted accordingly by calculating the offset from GMT for the current time zone (e.g., EST=GMT−5, CST=GMT−6, etc.). Finally, at a step 108, the calculated local time can be utilized by the system 10 to display the correct time dependent variable, and at step 110 the method concludes by displaying the signal 34*a* to the operator 14.

Where time information is not present in the map database 16, additional steps are included. In this configuration, once the vehicle location on the map 16 is determined, and at step 104, the ID link is utilized to match locale-specific information (state, province, country, etc) for the given position point with time zone and DST observance data from a time specific database 50.

V. Predictive Display of Upcoming Speed Limit Changes and Advisories

As previously mentioned, a novel aspect of the system 10 is the predictive manner of alerting the operator of upcoming speed limit changes or advisories. To this end, a preferred deceleration rate value is used to gauge the time to arrival of the vehicle to the location of the speed limit change. Similar to the advisory zone alert, the upcoming speed change is previewed to the driver at least $G_{MinimumPreviewTime}$ seconds in advance, possibly more depending on the amount of speed change that is required. The predictive time calculation is likewise shown below:

$$T_{SpeedLimitDecreasePreview} = \max\left\{\frac{(V_{Speed} - V_{UpcomingSpeedLimit})}{R_{PreferredDeleration}}, G_{MinimumPreviewTime}\right\}$$

Using this predictive time measure, the driver will always be informed of an upcoming speed limit decrease at least $G_{MinimumPreviewTime}$ seconds in advance of the sign location. So as to minimize confusion and deter speeding, upcoming speed limit increases are preferably not shown predictively, as it is appreciated that until the location of the new speed limit is achieved, the old speed limit remains in effect. However, if a speed limit increase preview is desired, the preceding calculation can be utilized to determine the preview time, where the absolute value of $(V_{Speed}-V_{UpcomingSpeedlimit})$ is utilized.

VI. Controlling the Vehicle

Where the vehicle 12 is operating under automated speed control (such as cruise control) and the system 10 has identified that the vehicle 12 is approaching a speed limit change or advisory speed zone, the preferred system 10 is further configured to automatically change the set vehicle speed to match the upcoming speed limit before the location of the speed sign. Similarly, where the vehicle speed is manually controlled, and the system 10 has determined an exceedance in speed, the preferred system 10 is further configured to automatically adjust the speed of the vehicle 12. For example, the system 10 could be communicatively coupled to the vehicle, so as to automatically actuate the brakes, bypass the accelerator pedal allowing engine and wind drag to slow the vehicle, or modify the fuel and/or air intake.

VII. Varying Advisory and Warning Behavior

Another novel aspect of the present invention is the ability of the system 10 to be modified or customized by the operator 14. In this regard, it is appreciated that operator preferences and environmental conditions can vary greatly. As such, the system 10 is further configured to acquire preferential data from the operator 14 or vehicle 12, and to modify the attributes and constants of the system accordingly. A preferred method of modifying the system 10 includes gathering information from the operator 14 regarding the preferred alert thresholds, either in terms of mph, kph or percent, gathering preferences from the operator 14 with respect to acceleration and deceleration rates (potentially based on vehicle shift modes such as "winter", "normal", and "sport"), and gathering preferences from the operator with respect to the timing and duration of upcoming advisory zones or speed limit alerts, wherein the input could be time-based, distance-based, or based on other criteria.

The preferred system 10 is yet further configured to alert the operator 14 differently for given attributes or indicia data. For example, the signal 34*a* may be modified depending upon the thoroughfare surface (paved/unpaved) and/or classification (freeways, arterial roads, side streets, etc), the time of day or day of the week, the familiarity of the area, the presence and intensity of certain weather conditions, or the presence of anticipated or actual traffic conditions. With respect to the later, the system 10 might behave more sensitively to speed limit exceedance when traffic congestion is high for safety reasons, or when the vehicle 12 is traveling alone for ticket-avoidance reasons.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. An adaptive navigational system adapted for use with a vehicle having an operator, wherein said vehicle is located at a vehicle location and traveling towards an indicia data location, said system comprising:

a map database having at least one record, wherein said record presents at least one path,
said path presenting a direction of travel, and includes a plurality of position points, wherein a first of said points is matched with the vehicle location and a second of said points is matched with the data location and correlated with indicia data;
a locator device communicatively coupled to the database, and configured to determine the vehicle location; and
an indicator communicatively coupled to the device and database, and configured to autonomously determine an adjustable arrival period for the vehicle to travel to the data location, determine an adjustable minimum preview period based on and correlative to the data, autonomously determine an advisory period not less than the preview period, and to cause a data-related signal to be predictively communicated to the operator for the pre-determined advisory period, when a comparison of a current vehicle condition and the indicia data selectively determines a warning condition, said data being a time-dependent variable, said database, device and indicator being cooperatively configured to determine the correct local time at the point, so as to achieve the proper variable.

2. The system as claimed in claim 1, said data being the existence of a maximum speed limit for the path, traffic sign or traffic device, the name of the thoroughfare upon which the vehicle is located, notification of an accident, or notification of a traffic jam, at the point.

3. The system as claimed in claim 1, said signal being a visually perceptible representation of the data.

4. The system as claimed in claim 1, said data indicating the beginning of an advisory zone, said zone presenting a zone ending defined by the beginning of an adjacent advisory zone having an opposite direction of travel, said advisory period being terminated upon the traversing of the zone ending, or upon the expiration of a constant advisory period value.

5. The system as claimed in claim 1, said map record being correlated with at least one time-zone, said indicator including a clock, and being further configured to adjust the clock according to the map record time zone.

6. The system as claimed in claim 5; and a time specific database communicatively coupled to the map database, and including a plurality of geographic territory records, wherein each geographic territory record presents an applicable time zone, said map record being correlated to at least one of said geographic territory records.

7. The system as claimed in claim 1, said first point being further correlated with a "Yes" or "No" day-light-savings observance value, said indicator including a clock, and being further configured to determine the local time in accordance with the value.

8. The system as claimed in claim 7; and a day-light-savings observance database communicatively coupled to the map database, and including a plurality of geographic territory records, wherein each geographic territory record presents a day-light-savings observance value, said map record being correlated to at least one of said geographic territory records.

9. An adaptive navigational system adapted for use with a vehicle having an operator, wherein said vehicle is located at a vehicle location and traveling towards an indicia data location, said system comprising:

a map database having at least one record, wherein said record presents at least one path, said path presenting a direction of travel, and includes a plurality of position points, wherein a first of said points is matched with the vehicle location, and a second of said points is matched with the data location and correlated with a speed limit for the path at the second point;

a locator device communicatively coupled to the database, and configured to determine the vehicle location; and an indicator communicatively coupled to the device and database, and configured to autonomously determine an adjustable arrival period for the vehicle to travel to the data location, determine an adjustable minimum preview period based on the data, and to cause a data-related signal to be predictively communicated to the operator for a pre-determined advisory period not less than the preview period, when a comparison of a current vehicle condition and the indicia data selectively determines a warning condition, said indicator being further configured to obtain the current speed of the vehicle, compare the current speed and speed limit, so as to determine a difference, and compare the difference or a percent of exceedance based upon the difference and speed limit to a warning threshold, so as to determine the warning condition.

10. The system as claimed in claim 9, said preview period being not less than the difference between the current vehicle speed and speed limit divided by a preferred rate of deceleration or acceleration.

11. The system as claimed in claim 9, said indicator including a plurality of warning thresholds, and being further configured to predictively communicate a plurality of data-related signals to the operator, wherein each signal is communicated upon the exceedance of a different warning threshold.

12. The system as claimed in claim 9, said indicator being further configured to predictively communicate a plurality of data-related signals to the operator, wherein each signal is communicated upon the exceedance of an increased percentage of the speed limit, so as to present a percentage offset.

13. The system as claimed in claim 12, wherein each signal is communicated upon the exceedance of the sum of an increased percentage of the speed limit and a constant, so as to present a combined multiplier and constant offset.

14. A method of predictively communicating a time-dependant variable condition to the operator of a vehicle, said method comprising the steps of:

a) accessing a map-database comprising a plurality of position points, each presenting an ID link, wherein said link is correlated with time-specific information;

b) obtaining the vehicle location in latitude and longitude;

c) matching the vehicle location with a position point within the map-database to obtain the ID link for the point;

d) obtaining the time-specific information correlated to the point using the ID link, and modifying the in-vehicle clock accordingly, so as to determine a correct local time; and e) utilizing the correct local time to determine the current condition.

15. The method as claimed in claim 14, step (c) further including the steps of obtaining locale-specific information using the ID link, and determining time specific information pertaining to the current locale.

16. The method as claimed in claim 15, step (c) further including the steps of communicatively coupling the map database with a time specific information database, and automatically determining the time specific information pertaining to the current locale.

* * * * *